United States Patent
Valderrama et al.

(10) Patent No.: US 9,944,005 B2
(45) Date of Patent: Apr. 17, 2018

(54) METHOD OF MAKING A BAYONET SEALING CLOSURE FOR CONTAINERS AND LIDS

(71) Applicant: Edgewell Personal Care Brands, LLC, Chesterfield, MO (US)

(72) Inventors: Vincent Valderrama, Staten Island, NY (US); John Rousso, Trumbull, CT (US); Dmitriy Faktorovich, Oakland, NJ (US); Stephen Mowers, Cheshire, CT (US)

(73) Assignee: Edgewell Personal Care Brands, LLC., Chesterfield, MO (US)

( * ) Notice: Subject to any disclaimer, the term of this patent is extended or adjusted under 35 U.S.C. 154(b) by 553 days.

(21) Appl. No.: 14/552,722

(22) Filed: Nov. 25, 2014

(65) Prior Publication Data
US 2015/0145170 A1    May 28, 2015

Related U.S. Application Data

(60) Provisional application No. 61/908,956, filed on Nov. 26, 2013.

(51) Int. Cl.
| | |
|---|---|
| *B29C 33/48* | (2006.01) |
| *B29C 45/26* | (2006.01) |
| *B29C 45/44* | (2006.01) |
| *B65D 41/06* | (2006.01) |
| *B29L 31/00* | (2006.01) |
| *B29L 31/56* | (2006.01) |

(52) U.S. Cl.
CPC ........ *B29C 45/2618* (2013.01); *B29C 33/485* (2013.01); *B29C 45/4435* (2013.01); *B65D 41/06* (2013.01); *B29K 2905/12* (2013.01); *B29L 2031/56* (2013.01); *B29L 2031/7158* (2013.01)

(58) Field of Classification Search
CPC ............ B29C 45/2618; B29C 45/4435; B29C 2045/4442; B29C 45/44
See application file for complete search history.

(56) References Cited

U.S. PATENT DOCUMENTS

| | | | |
|---|---|---|---|
| 4,806,301 A * | 2/1989 | Conti | B29C 33/42 264/318 |
| 5,240,719 A * | 8/1993 | Hedgewick | B29C 33/485 425/441 |
| 2006/0119007 A1* | 6/2006 | Hoogland | B29C 45/0081 264/328.1 |

* cited by examiner

*Primary Examiner* — Galen H Hauth
(74) *Attorney, Agent, or Firm* — Edgewell Personal Care Brands, LLC

(57) ABSTRACT

A method for forming a container assembly having a lid, a container and a cooperative closure mechanism, includes providing a lid form and flexible members biased toward the lid form, wherein the lid form and the flexible members are operable between a forming position defined by the lid form exerting a biasing force against the flexible members, and an extraction position defined by the biasing force being substantially removed from the flexible members, creating a lid form cavity defined by the lid form and the flexible members disposed in the forming position, injecting a lid material throughout the lid form cavity to form a lid, disposing the lid form and the flexible members in the extraction position, wherein the lid form is moved distal from the lid and the flexible members are biased away from the lid to separate the lid from the flexible members.

20 Claims, 10 Drawing Sheets

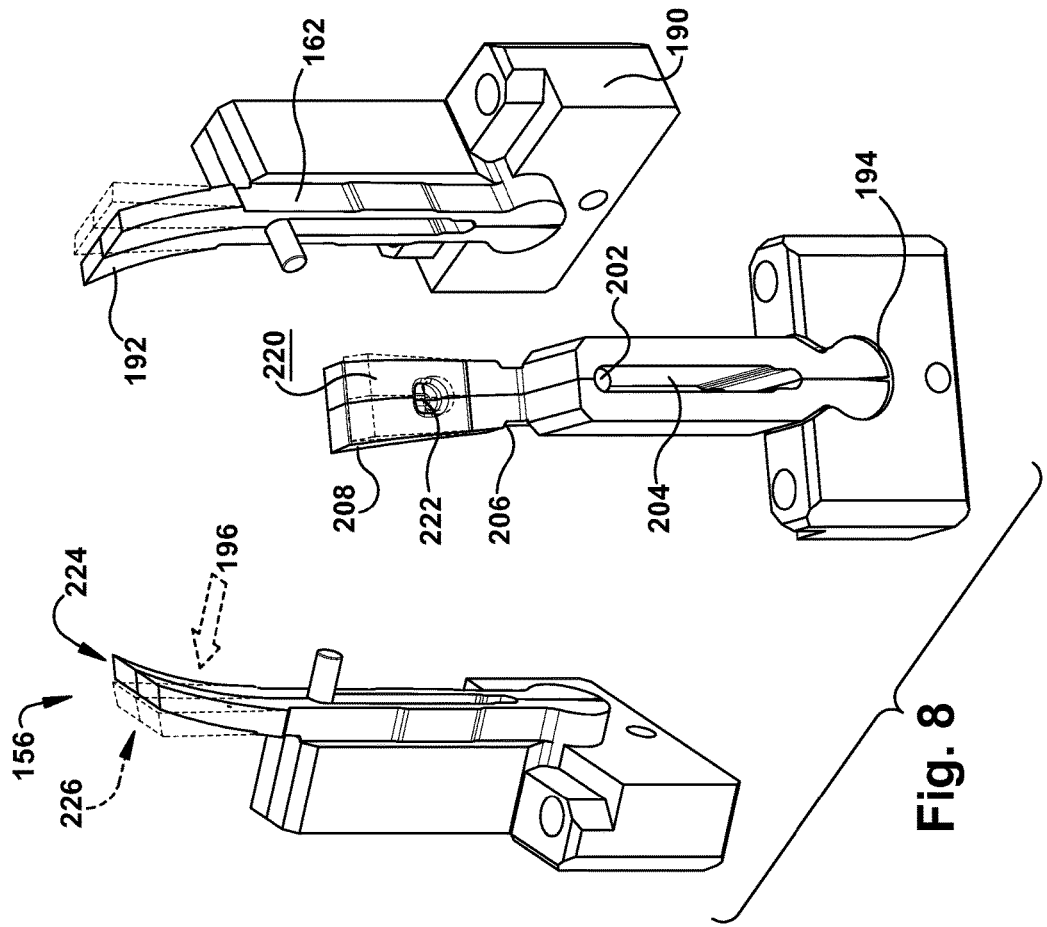
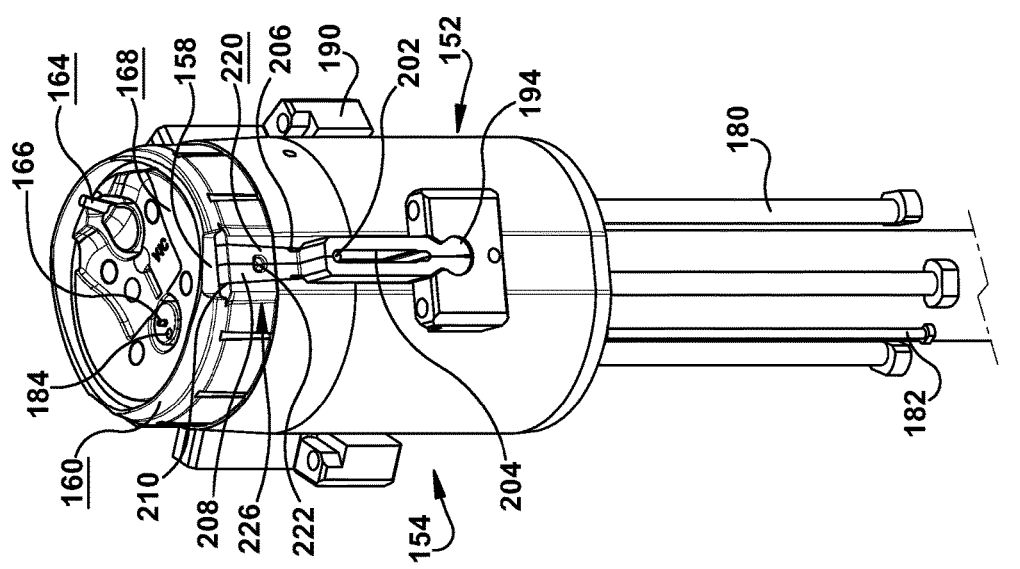
Fig. 8
Fig. 7

METHOD OF MAKING A BAYONET SEALING CLOSURE FOR CONTAINERS AND LIDS

This application incorporates and claims the benefit of the filing date of U.S. Design patent application Ser. No. 61/908,956, entitled Method of Making A Bayonet Sealing Closure For Containers And Lids filed Nov. 26, 2013, the entirety of which is incorporated herein by reference.

FIELD OF THE INVENTION

The present disclosure relates generally to a closure mechanism for a lid and container assembly that avoids the use of threads on the lid. More particularly, the present disclosure relates to a closure mechanism for a lid and container assembly with the closure effected by a channel arrangement on the cup portion of the container and interacting component(s) on the lid portion of the container, as well as a method for creating components of the container assembly.

BACKGROUND

Infant cups on the market use standard helical threads for closure of a lid portion to a cup portion. As the majority of cups are made of plastic, there are several disadvantages when using this type of closure feature. Typical materials used in this category include polyolefin based materials, such as polypropylene or polyethylene. When molded, these materials tend to bind when torqued against each other during closure. This is the type of action that can occur using helical threads as the closure mechanism. This binding often causes lids that have been connected to the cup using helical threads to be difficult to remove. Also, these polyolefin based materials have a high degree of variability that is further increased by using different color polyolefin in the production of the cup and lid. This variability makes it difficult to ensure proper function of the complex geometry used in making a lid and cup combination so that the container and lid close sufficiently to ensure complete or near complete resistance to leakage.

Also, to ensure that there are no in-mold stresses during normal wear of the product requires that "best practices" for the plastic part design is to maintain constant wall stock thickness where possible. Deviations in thickness in the main wall stock of the container and/or lid adds to the possibility of in-mold stresses and, concomitantly, potential deformation of the part. Deformation of the part may, in turn, cause leakage of liquid contained in the cup.

Further, helical threads also often cause inconsistent wall stock thickness on both the male and female mating parts. Moreover, helical threads in plastic parts tend to be difficult to align at the beginning of the threading process that sometimes leads to damage of the threads on either or both of the lid or the cup. Such damage can lead to improper sealing that again could lead to unwanted leakage.

So-called "sippy cup" lids are generally non-symmetrical parts, mostly due to the addition of a non-symmetrical drinking feature, such as a spout in a raised position on and above the upper surface of the lid. The use of non-symmetrical parts makes it difficult to achieve a plug seal when mating the lid and cup. This shortcoming is compounded by having uneven wall stock in the threads, again usually due to the material and manufacturing processes employed in producing the threads on the lid and the cup. These two features, difficulty in achieving a plug seal and uneven wall thickness, often lead to the parts having the tendency to be "out of round" or not flat, depending on the portion of the lid and cup combination in question. In order to achieve a good, preferably leak-proof, seal with a part that has the above tendencies, the lid must be "torqued-on" with a high degree of force (on the order of 25 lbs. or greater) in order to flex the seal geometry such that it correctly or completely plugs. This force is greater than most end users can comfortably achieve. Moreover, such repetitive force may have the additional drawback of prematurely wearing the threads on the lid or the cup, or both.

It is desirable to manufacture a container and lid having a closure mechanism that does not utilize threads as well as a method for manufacturing a thread-free closure mechanism for a container assembly.

SUMMARY

The above advantages are provided by a method of making a bayonet sealing closure for containers and lids according to the present invention.

According to a first aspect of the present invention is a method for forming a container assembly having a lid, a container and a cooperative closure mechanism defined by the lid and a container. The method includes providing a first lid form having an outer wall and at least one channel, and providing a flexible member disposed in each of the at least one channel, wherein the flexible member is biased towards the first lid form. The method also includes creating a lid form cavity that is at least partially defined by an outward surface of the flexible member, and injecting at least one lid material substantially throughout the lid form cavity to form a lid. The method also includes retracting the first lid form from a forming position, relative to the flexible member and the lid to an extraction position, wherein the flexible member is biased inward, as the first lid form is retracted to separate the outward surface of the flexible member from a side wall of the lid, and separating the lid from the flexible member. Embodiments of the first aspect of the invention can include any one or a combination of the following features:
  The method includes, as part of the step of injecting at least one lid material, forming an inward protrusion within a recess defined by the outward surface of each flexible member, wherein the inward protrusion is disposed on an inward surface of the side wall of the lid;
  The first lid form includes a plurality of channels, wherein each of the plurality of channels is configured to receive a corresponding flexible member;
  The first lid form includes three channels;
  The flexible member is made of a tool grade steel;
  The lid form cavity is defined by the first lid form, each flexible member and a second lid form;
  The method includes, as part of the step of separating the lid from the flexible member, extending at least one expulsion member from an expulsion aperture defined within an upper surface of the first lid form, and pushing the lid distal from the flexible member, using the at least one expulsion member;
  The method includes retracting the expulsion member, and extending the first lid form from the extraction position to the forming position, wherein the flexible member is biased outward by and positioned within the corresponding at least one channel of the first lid form as the first lid form is moved into the forming position.

A second aspect of the present invention is a method for forming a container assembly having a lid, a container, and a cooperative closure mechanism defined by the lid and a container, the method including providing a form including an interior wall and at least one flexible member biased toward the interior wall, the interior wall and the at least one flexible member at least partially defining a cavity of the form. The method also includes injecting at least one forming material substantially throughout the cavity to form a container assembly part within the cavity. The method also includes longitudinally retracting the interior wall relative to the at least one flexible member and the container assembly part from a forming position to an extraction position, wherein each of the at least one flexible members is biased inward toward the interior wall of the form and away from a side wall of the container assembly part. The method also includes the step of separating the container assembly part from the flexible member.

Embodiments of the second aspect of the invention can include any one of a combination of the following features:
  A recess is defined within each at least one flexible member, each recess further defining the cavity, and wherein the step of injecting the at least one formed material includes forming an inward protrusion of the container assembly part within each recess, and wherein when the form is longitudinally retracted and the at least one flexible member is biased inward, the inward protrusion of the container assembly part is disengaged from the corresponding recess of each of the at least one flexible member;
  The form includes a plurality of flexible members;
  The form includes three flexible members;
  The at least one flexible member is made of a tool grade steel having an HRC of between about 52 to about 54;
  The cavity is defined by the interior wall, the at least one flexible member and an outer wall;
  The method includes, within the step of separating the container assembly part from the at least one flexible member, extending at least one expulsion member from an expulsion aperture defined within an upper surface of the form, and pushing the container assembly part distal from the flexible member, using the at least one expulsion member;
  The method includes retracting the expulsion member, and extending the interior wall from the extraction position to the forming position, wherein the at least one flexible member is biased outwardly by the interior wall as the interior wall is moved into the forming position;

A further aspect of the present invention includes a method for forming a container assembly having a lid, a container and a cooperative closure mechanism defined by the lid and the container. The method includes providing a first lid form and three flexible members coupled to and biased toward the first lid form, wherein the first lid form and the three flexible members are operable between a forming position defined by the first form member exerting a biasing force against the three flexible members, and an extraction position defined by the biasing force of the first formed member being substantially removed from the three flexible members. The method also includes creating a lid form cavity at least partially defined by the first lid form and the three flexible members disposed in the forming position. The method also includes injecting at least one lid material substantially throughout the lid form cavity to form a lid. The method also includes disposing the first lid form and the three flexible members in the extraction position, wherein the first lid form is moved distal from the lid and the three flexible members are biased away from the side wall of the lid. The method also includes separating the lid from the three flexible members.

Embodiments of this further aspect of the invention can include any one or a combination of the following features:
  Each of the three flexible members includes a corresponding recess, wherein the step of injecting the at least one lid material includes forming an inward protrusion within each recess;
  The three flexible members are made of a tool grade steel having an HRC of between about 52 to about 54;
  The method includes, within the step of separating the lid from the three flexible members, extending at least one expulsion member from an expulsion aperture defined within an upper surface of the first lid form, pushing the lid distal from the three flexible members using the at least one expulsion member, capturing the lid distal from the three flexible members in the first lid form, retracting the at least one expulsion member, and positioning the first lid form and the three flexible members in the forming position;

These and other features, advantages and objects of the present invention will be further understood and appreciated by those skilled in the art by reference to the following specification, claims and appended drawings.

Unless otherwise specified herein, all disclosed characteristics and ranges are as determined at room temperature (20-25° C.).

BRIEF DESCRIPTION OF THE DRAWINGS

In the drawings:

FIG. 7 is a partial perspective view of the lower form member of FIG. 6, disposed in the forming position;

FIG. 8 is a top perspective view of the flexible members of the lower form of FIG. 7 with the flexible forms disposed in the extraction position;

DETAILED DESCRIPTION

Figure 1:
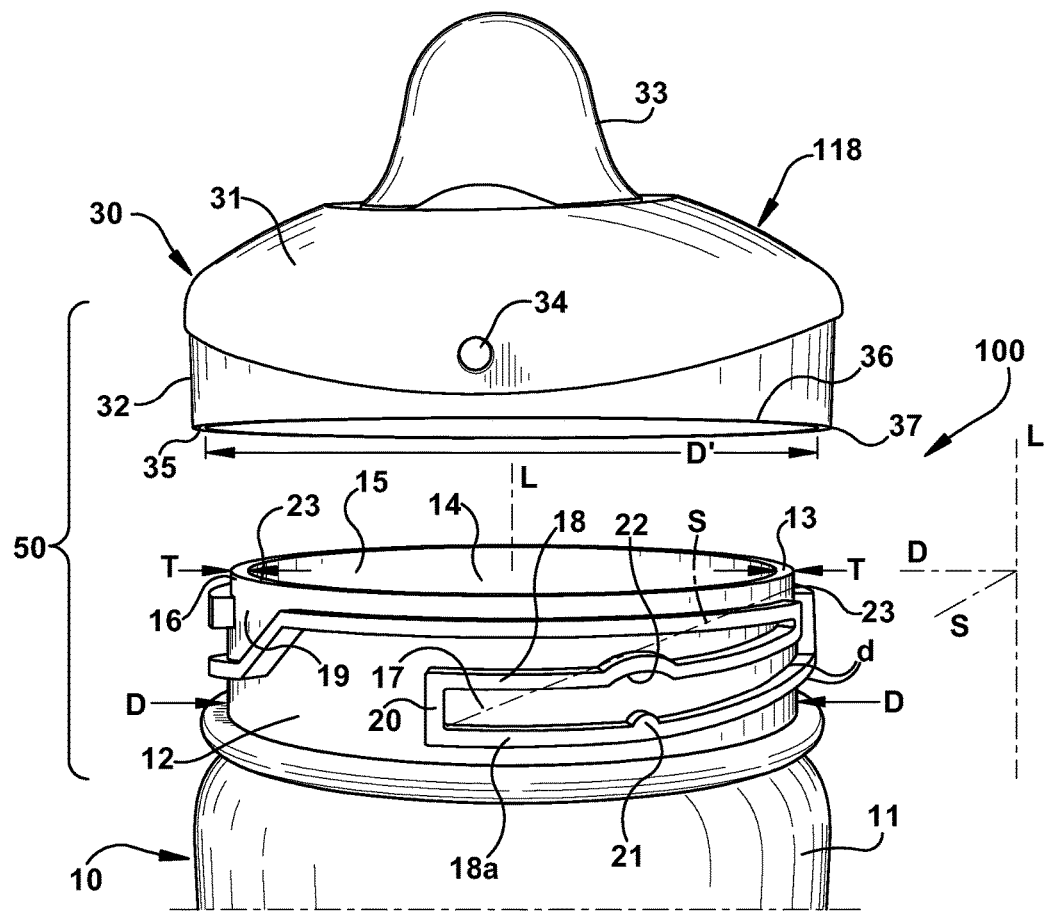
FIG. 1 is a side perspective view of one embodiment of a container assembly manufactured according to one embodiment of the method.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the drawings and, in particular, FIG. 1, an embodiment of a container assembly comprised of a container and lid of the present disclosure is shown, and generally referenced by reference numeral 100. Container assembly 100 has a container 10 and a lid 30.

Container 10 has a body 11 and a neck 12. Neck 12 is substantially parallel to a longitudinal axis L of container 10. Neck 12 has an edge 13 forming a container opening 14. Container opening 14 has an outer diameter D and provides access to an internal volume of body 11. Diameter D has an inner periphery 15 and an outer periphery 16. Inner periphery 15 and outer periphery 16 provide edge 13 with a thickness T. Disposed on outer periphery 16 are one or more channels 17. Channel 17 has an upper wall 18 and lower wall 18a. Channel 17 has disposed at one end thereof an opening 19 and disposed at the other end thereof a connection 20. Upper and lower walls 18 and 18a are preferably substantially parallel to each other. Channel 17 is preferably disposed on neck 12 such that opening 19 is disposed proximal edge 13 and connection 20 is disposed distal edge 13, providing channel 17 with a slope S. Slope S generally forms an obtuse angle with respect to longitudinal axis L of container 10 and a line drawn perpendicular to longitudinal axis L, that perpendicular line representing outer diameter D, as S is measured at a location 23 on outer periphery 16 at edge 13 at the middle of opening 19; this will be shown in more detail in FIG. 2. Preferably, lower wall 18a has detent 21 disposed thereon and upper wall 18 has an indent 22 disposed generally opposite to detent 21. Detent 21 and indent 22 serve to provide tactile and/or audible indications that closure of lid 30 to container 10 has been properly effected when inward protrusion 41 (see, FIG. 4) passes over detent 21, which will be described in more detail with respect to FIG. 4. Connection 20 serves to provide structural rigidity to upper and lower walls 18 and 18a and to act as a "stop" in the path that is the length of channel 17.

Still referring to FIG. 1, lid 30 has an upper surface 31 and a lower surface 32. Lower surface 32 has an edge 35. Edge 35 has an inner periphery 36 and outer periphery 37. Inner periphery 36 provides lower surface 32 with an inner diameter $D^1$. Lower surface 32 is substantially parallel to longitudinal axis L of container 10. As shown in FIG. 1, upper surface 31 has a spout 33. Spout 33 is one optional configuration of lid 30; however, lid 30 could also be configured to receive a straw, have a flip top opening, as well as other types of dispensing configurations. Diameter $D^1$ is of sufficient dimension so as to allow lower surface 32 to cover neck 12 and channels 17 when lid 30 is disposed onto container 10. Upper surface 31, as shown in FIG. 1, also has an external protrusion 34 disposed above edge 35 and external to upper surface 31. External protrusion 34 serves to indicate alignment of inward protrusions 41 (see, FIG. 4) with openings 19 of channels 17, and to provide gripping areas on lid 30 for rotating and tightening lid 30 onto container 10.

Referring again to FIG. 1, as apparent to those skilled in the art, slope S will vary depending upon the number of openings 19 of container assembly 100 and the height from edge 13 to lower wall 18a that lid 30 must be drawn down upon for edge 13 to contact inner flange 42 (see, e.g., FIG. 4) of lid 30 to effect sealing closure of lid 30 to container 10. For example, if the number of openings 19 is one, slope S will be less than if the number of openings 19 is three because, to effect closure of lid 30 onto container 10, lid 30 needs to traverse substantially the complete outer periphery 16 of neck 12 of container 10. Although the number of openings 19 must be at least one, preferably there is a plurality of openings 19 disposed around neck 12 of container 10 and, more preferably, the number of openings 19 disposed around neck 12 of container 10 is between 2-4. Also preferably, where there is a plurality of openings 19, these are preferably disposed radially equidistant from each other around neck 12. This is shown more clearly with respect to FIG. 2.

Figures 2, 3:
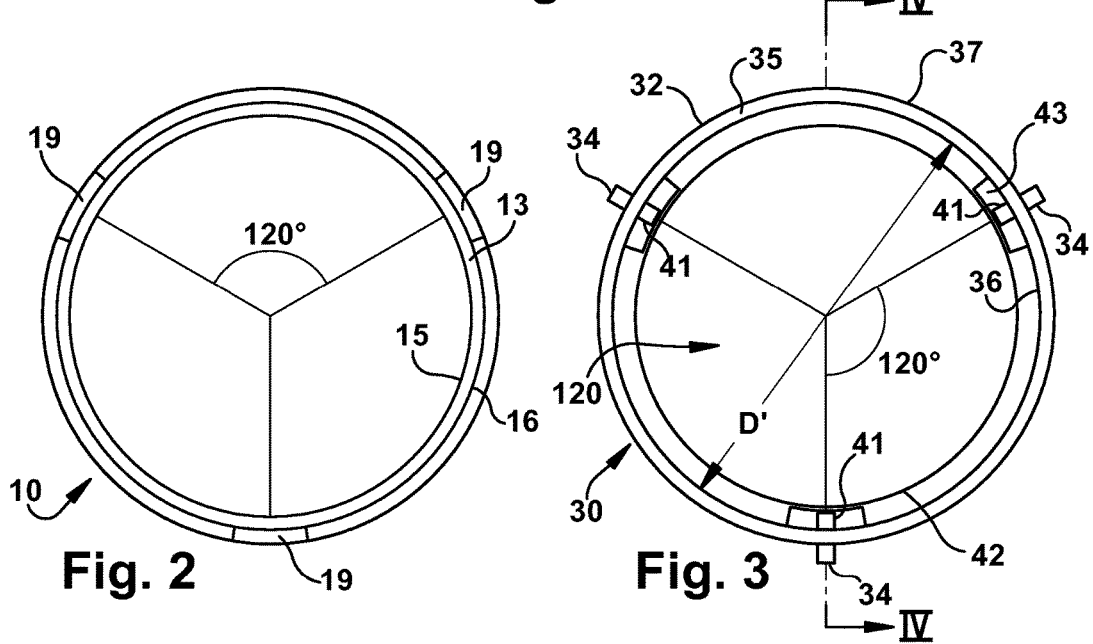
FIG. 2 is a schematic top plan view of the container of FIG. 1.
FIG. 3 is a schematic bottom plan view of the lid of FIG. 1.

Referring to FIG. 2, in the embodiment shown, three openings 19 are disposed radially equidistant from each other around neck 12 of container 10. In FIG. 3, the three (3) openings 19 are each spaced approximately 120° from each other. In this configuration, edge 13 is drawn into more uniform contact with inner flange 42 (see, FIG. 4) so as to effect a more complete seal between edge 13 and inner flange 42. Of course, as mentioned above, there can be as few as one opening 19 and one channel 17 disposed on container 10. In this case, preferably, channel 17 will traverse substantially completely the outer periphery 16 of neck 12 of container 10. In the case of, for example, two openings 19 and two channels 17 disposed on neck 12 of container 10 each channel 17 will traverse, preferably, approximately halfway around the outer periphery 16 of neck 12 of container 10. However, the foregoing need not be so and, regardless of the number of channel(s) 17, they may be placed on the outer periphery 16 of neck 12 of container 10 as a matter of design choice in any particular instance. For example, channel(s) 17 need not be placed on the outer periphery 16 of neck 12 in a radially equidistant manner, but may be placed on the outer periphery 16 of neck 12 in a skewed manner. Also, in any particular instance, there may be added to edge 13 a material that may assist in effecting sealing closure of lid 30 to container 10, but this is not required of the present disclosure and may, preferably, be omitted.

Figure 4:
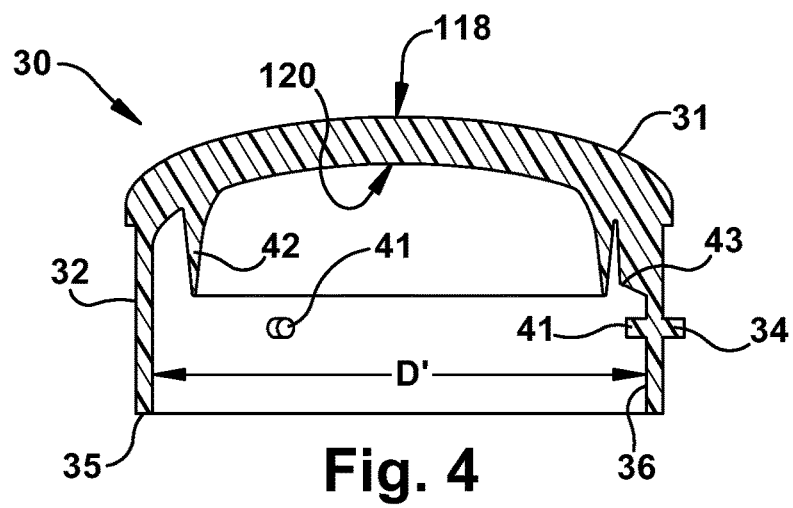
FIG. 4 is a schematic cross-sectional view of the lid of FIG. 3, taken along line IV-IV.
Figure 5:
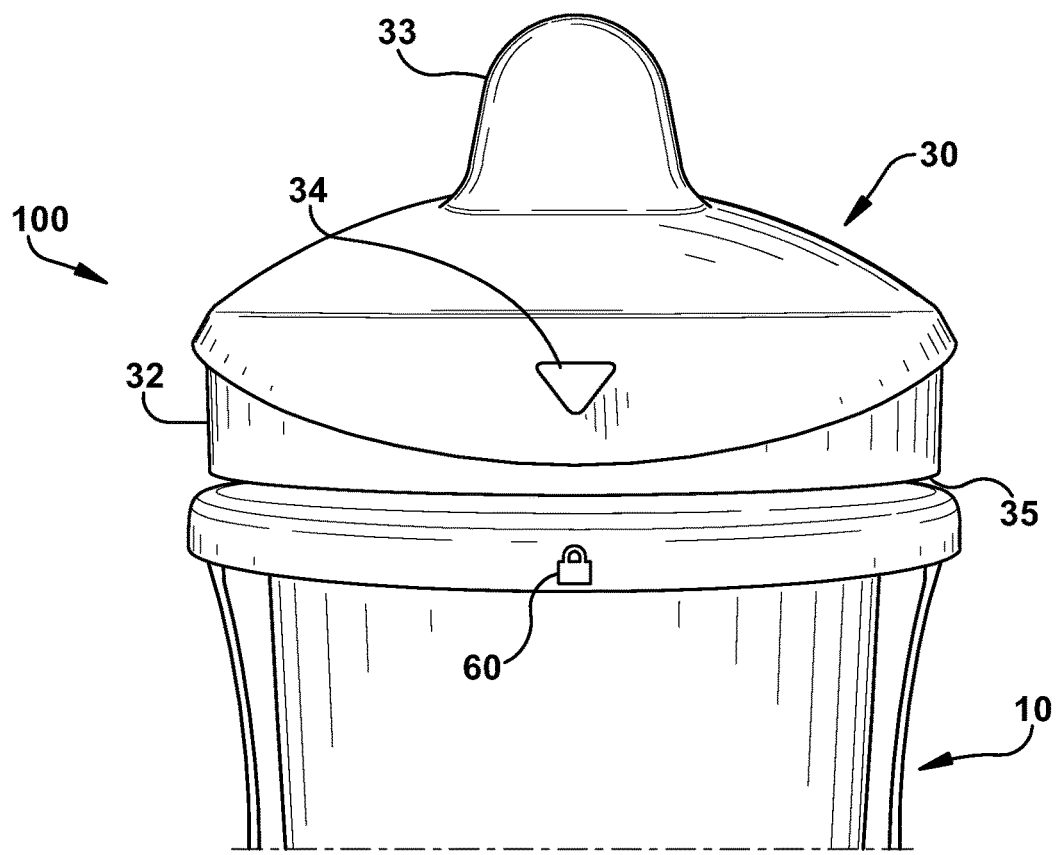
FIG. 5 is a side elevational view of the container assembly of FIG. 1, with the lid engaged with the container.

Referring to FIGS. 3 and 4, at least one inward protrusion 41 is disposed on the inner periphery 36 of lid 30 opposite the at least one external protrusion 34 disposed on the lower surface 32 of lid 30. External protrusion 34 serves to simplify proper alignment of inward protrusion(s) 41 with openings 19. As mentioned previously, external protrusion 34 also serves to simplify rotation and tightening of the lid 30 onto the container 10. As shown in FIG. 3, inward protrusions 41 are disposed radially equidistant around the inner periphery 36 of the lid 30, in this case 120° from each other.

Referring to FIG. 4, inner flange 42 is dimensioned sufficiently to effect a proper seal with edge 13 to prevent the leakage of liquid from container assembly 100 if container assembly 100 is tipped or knocked over. As discussed above with respect to FIG. 2, the number of inward protrusions 41 may vary according to the number of openings 19 and, preferably, the number of inward protrusions 41 is equal to the number of openings 19. However, as will be apparent to those skilled in the art, the number of inward protrusions 41 may be different than the number of channels 17. It is contemplated that one or more flange biasing features 43 can be disposed proximate the inward protrusions 41 and the inner flange 42, where the flange biasing features 43 include a sloped surface that is configured to apply an inward biasing force against the container 10 as the container 10 is secured within the lid 30. As the lid 30 is secured to the container 10, the flange biasing features 43 engage portions of the outer periphery 16 of the container 10 and bias the inner periphery 15 of the container 10 against the inner flange 42 of the lid 30. In this manner, a substantially water-tight seal is achieved between the inner periphery 15 of the container 10 and the inner flange 42 of the lid 30. The achievement of the water-tight seal between the inner periphery 15 and the inner flange 42 is configured to substantially coincide with the passage of the inward protrusions 41 past the corresponding indents 22 of the upper wall 18 and the detents 21 of the lower wall 18a. Also, although the present disclosure has been described as having external protrusion(s) 34 disposed on the lower surface 32 of lid 30 opposite the inward protrusion(s) 41, this need not be the case. In fact, external protrusion(s) 34 may be omitted completely. External protrusion(s) 34 serve several purposes as described above, but are not required for the practice of the present disclosure. In another embodiment, external protrusion(s) 34 may not be "protrusions" at all, but may be "depressions" or a visual indicator 60 such as a color marking disposed on lid 30. Also, detent(s) 21 and indent(s) 22 may be omitted from one or all of channel(s) 17. Detent(s) 21 and indent(s) 22 are described herein as comprising a design feature of a preferred embodiment of the present disclosure.

FIG. 4 shows another preferred embodiment of the container assembly 100 of the present disclosure. In the embodiment of FIG. 4, external protrusion 34 is designed to align with an indicator 60 to provide additional feedback to a user that closure of lid 30 and container 10 is proper and complete. As with the external protrusion(s) 34, indicator 60 may be omitted, or may, if used, be in any form desired for any particular application.

For the lid 30, the design having inward protrusions 41 avoids the need for helical threads. Rather, having the inward protrusions 41 in several locations along the inner periphery 36 of lid 30, preferably spaced radially equidistant from each other, reduces the amount of plastic, as well as the area of uneven wall stock. This results in a more uniform wall stock and thereby improves the ability to manufacture the part so that it has proper circularity, especially with consideration of the seal bead between the lid 30 and the container 10. Thus, the "bayonet" closure of the present disclosure ensures a proper seal when lid 30 and container 10 are assembled.

For the container or cup 10, the "track" geometry in the nature of a channel 17 allows for easier assembly, without the possibility of binding of plastic-on-plastic surfaces, especially often resulting from designs having threads on lid 30 and container 10, as is the usual case with prior art assemblies. This is due to the fact that inward protrusions 41 are much smaller in surface area as compared to conventional helical thread designs. The design also improves the ability for the parts to create a good seal at lower assembly torques. The improved ability to create a good seal is mainly due to the increased ability to mold a round/circular part with this design that ensures more proper circularity for the lid component especially.

One specific embodiment of the present disclosure is a container assembly 100 that has container 10 and lid 30. Container 10 has body 11 with a body diameter. Body diameter is defined by an inner diameter $D^1$ and an outer diameter D. Inner and outer diameters $D^1$ and D of body 11 may vary along longitudinal axis L to provide body 11 with a contoured shape. Container 10 also has a neck 12 disposed generally above the body 11 and is generally parallel to a longitudinal axis L of the body 11. Outer diameter D may be smaller or greater than the diameter of the body 11, depending upon the particular configuration of the container 10. The neck 12 has an inner periphery 15 and an outer periphery 16, providing neck 12 with an edge 13 and a container opening 14 that provides a volume to container 10. Neck 12 also has one or more channels 17 disposed on outer periphery 16. Lid 30 has an upper surface 31 and a lower surface 32. Lower surface 32 has an edge 35 defined by an inner periphery 36 and an outer periphery 37 of lid 30. Inner periphery 36 has a diameter designed to accept the outer diameter D of neck 12 including the depth "d" of upper and lower walls 18 and 18a. Inner periphery 36 also has one or more inward protrusions 41 designed and placed on inner periphery 36 to matingly engage and slidingly couple to the one or more channels 17. The channels 17 include upper and lower walls 18 and 18a, preferably substantially parallel walls, disposed apart from each other. Upper and lower walls 18 and 18a have an opening 19 disposed at one end for accepting the one or more inward protrusions 41 and a connection 20 disposed at the other end of channel 17, opposite opening 19, for obstructing the travel path of the one or more inward protrusions 41 through the channel 17. Preferably, the one or more channels 17 are disposed on neck 12 with opening 19 between upper and lower walls 18 and 18a disposed proximal to the container opening 14 that provides volume to container 10. As mentioned, the container opening 14 provides a volume for holding contents, preferably liquid contents. Preferably, the one or more channels 17 are disposed on neck 12 with connection 20 in the upper and lower walls 18 and 18a disposed distal to container opening 14 of container 10. Also preferably, channels 17 and inward protrusions 41 are disposed radially equidistant around outer periphery 16 and inner periphery 36 of container 10 and lid 30, respectively.

In the various embodiments, it is contemplated that the various aspects of the closure mechanism 50 disposed on the lid 30 and those aspects of the closure mechanism 50 disposed on the container 10 can be switched. Additionally, it is contemplated that the container assembly 100 described above and the closure mechanism 50 for that container assembly 100 can be disposed in a variety of container assemblies 100 that include, but are not limited to, sippy cups, food containers, beverage containers, food storage devices, and other various containers related to food and beverage storage.

Referring now to FIGS. 6-12, an injection molding assembly 110 is configured to manufacture a lid 30 of the container assembly 100, according to one embodiment. It should be understood that the injection molding assembly 110 and the process described herein can be used to manufacture other components of the container assembly 100, including the container 10, valves, closure mechanisms 50, and other aspects of various container assemblies 100.

Figure 6:
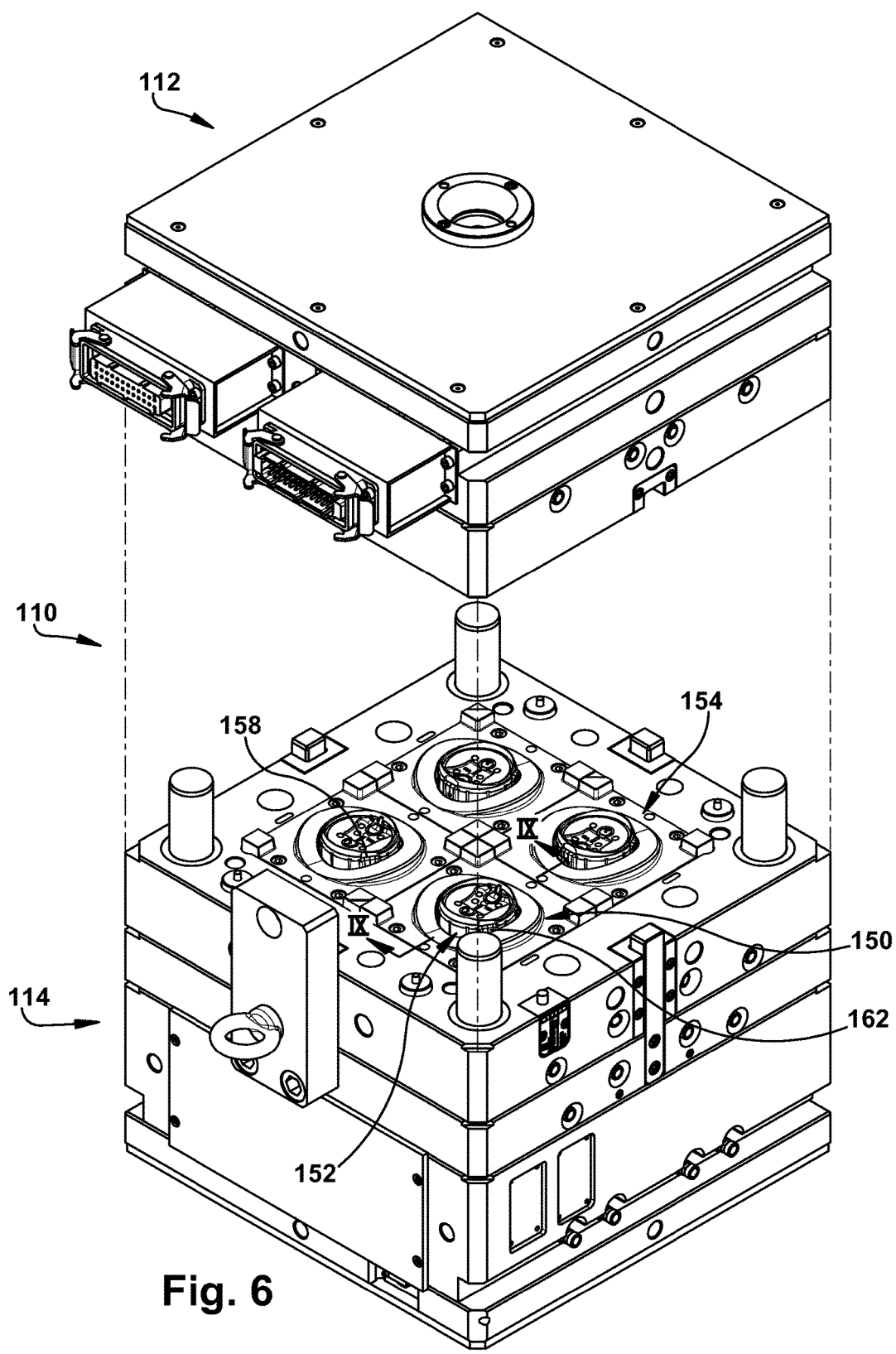
FIG. 6 is a top perspective view of an injection molding assembly that is configured to form an embodiment of the lid according to an alternate embodiment of the method.

Referring now to FIG. 6, the injection molding assembly 110 includes an upper lid form 112 and a lower lid form 114 that cooperate to form individual lid form cavities 116 into which a forming material 132 can be injected. The upper lid form 112 is configured to be lowered onto the lower lid form 114 to create the lid form cavity 116, and to be subsequently raised such that the lid 30 created within the lid form cavity 116 can be removed from the injection molding assembly 110. In various embodiments, the upper lid form 112 is configured to at least partially define an outward-facing surface 118 of the lid 30 that is formed within the lid form cavity 116. The lower lid form 114 is configured to form the inward-facing surface 120 of the lid 30 formed within the cavity 116. It is contemplated that the upper lid form 112 and the lower lid form 114 can be switched, such that the inward-facing surface 120 of the lid 30 is formed by the upper lid form 112 and the outward-facing surface 118 of the lid 30 is formed by the lower lid form 114.

Figure 9:
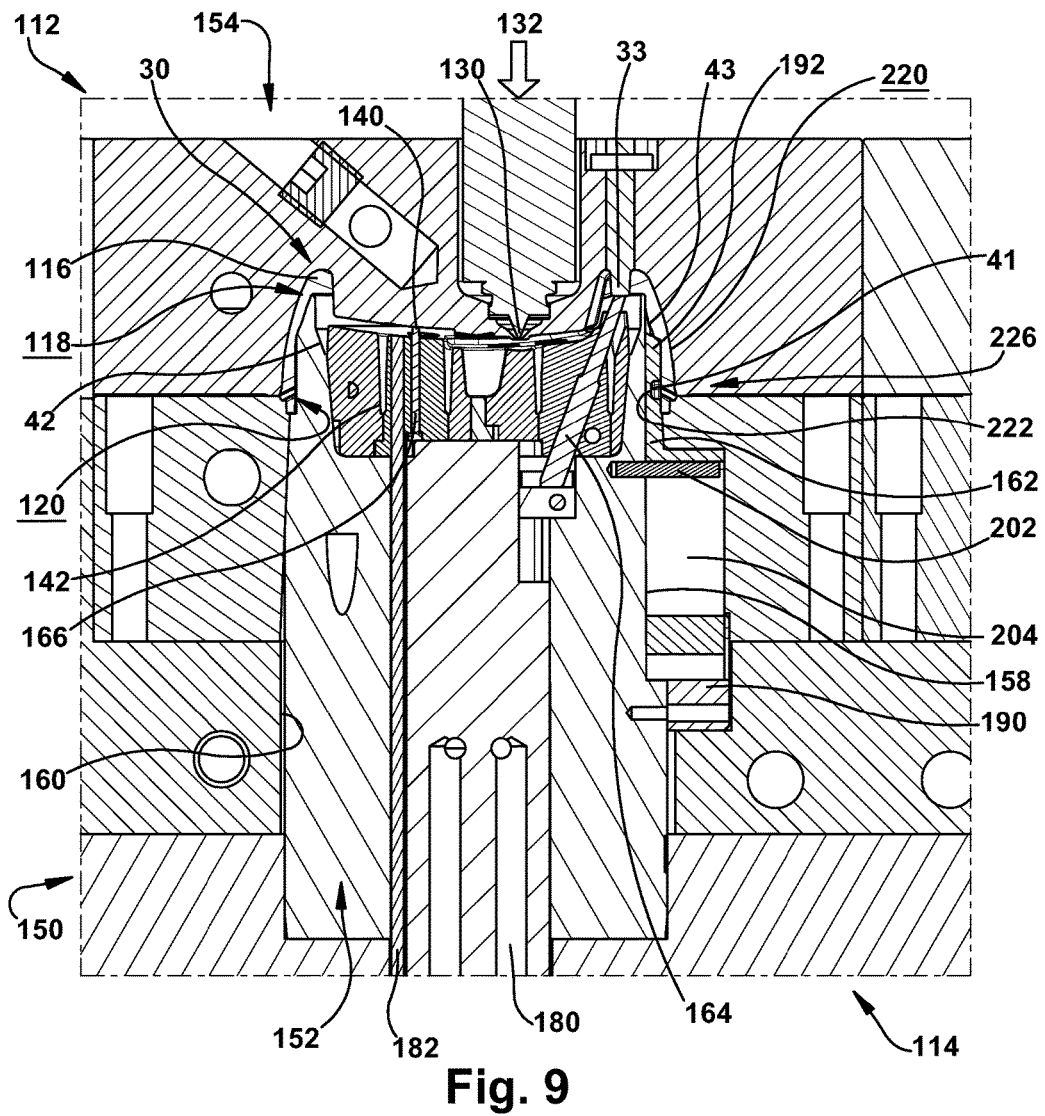
FIG. 9 is a partial cross-sectional view of the injection molding assembly of FIG. 6 with the upper form member in a lower position, taken along line IX-IX.

Referring now to FIGS. 6 and 9, the upper lid form 112 can include the various material injection aspects of the injection molding assembly 110. In this manner, the upper lid form 112 includes one or more injection ports 130 that are in communication with corresponding lid form cavities 116, wherein the injection ports 130 are configured to deliver the forming material 132 into each of the lid form cavities 116 to define a lid 30 within each of the corresponding lid form cavities 116. The upper lid form 112 is typically operated through a hydraulic mechanism, but can also be operated through a variety of other mechanisms that include, but are not limited to, manual operations, pneumatic operations, motorized mechanisms, and the like. The upper lid form 112 is typically made from a metallic material, wherein the metallic material can include, but is not limited to, steel, steel alloys, stainless steel, tool grade steel, aluminum, resin, composites, and other substantially rigid materials that can be used as dies for forming plastic type components. By way of example, and not limitation, the upper lid form 112 can be made from S136 stainless steel having an HRC (Rockwell C Hardness) of between about 48 to about 52.

Referring now to FIGS. 6-11, the lower lid form 114 can include various operable aspects of the injection molding assembly 110 that are configured to define various protrusions and apertures within the lid 30 formed within the lid form cavity 116, including, but not limited to, inward protrusions 41, the inner flange 42, the spout 33, vents 140, valve receptacles 142, flange biasing features 43, among others. The lower lid form 114 can include one or more lower cavity forms 150, wherein each lower cavity form 150 includes a vertically operable core form 152, wherein each core form 152 is vertically operable within the lower cavity form 150, between a forming position 154 and an extraction position 156, as will be more fully described below. Each core form 152 defines one or more form channels 158 disposed within the outer surface 160 of the core form 152. Each form channel 158 is configured to receive a flexible member 162 of the lower cavity form 150. As the core form 152 moves vertically, the flexible members 162 are configured to slide within the form channel 158 of the core form 152. The core form 152 also includes a spout form 164 and a vent form 166 that are configured to define various solids within the lid form cavity 116. These solids ultimately define various apertures within the lid 30, such as a spout 33, vent 140, or other aperture of the lid 30. The top surface 168 of the core form 152 is configured to define various depressions wherein various features of the lid 30 are formed, that include, but are not limited to, the inner flange 42, valve receptacles 142, structural members, and other physical features.

Referring again to FIG. 7, the core form 152 includes various vertical members that extend from a bottom surface of the core form 152, including a plurality of guides 180 and at least one expulsion member 182. The guides 180 are configured to control the vertical movement of the core form 152 between the forming position 154 and the extraction position 156, as will be more fully described below. The expulsion member 182 is disposed within an expulsion aperture 184 of the core form 152 and is configured to vertically operate through the core form 152 and engage the inward-facing surface 120 of the lid 30 formed within a lid form cavity 116, wherein the expulsion member 182 pushes the formed lid 30 away from the lower cavity form 150 and the flexible members 162, as will be more fully described below.

Referring now to FIGS. 7-9, one or more flexible members 162 are engaged with the core form 152 at corresponding form channels 158 defined by the outer surface 160 of the core form 152. Each flexible member 162 is attached to a flexible-member base 190 that is fixedly attached to the lower cavity form 150. In this manner, as the core form 152 moves vertically within the lower cavity form 150, the flexible members 162 remain in a fixed position relative to the lower cavity form 150 and the lower lid form 114 and allow the core form 152 to move independently of the flexible members 162. Each of the flexible members 162 includes a biased portion 192 that curves in an inward direction toward the core form 152. The flexible member 162 is engaged to the flexible-member base 190 through a cooperative retention feature 194 wherein the flexible member 162 is received by the flexible-member base 190. In this manner, the flexible member 162 can be easily replaced if the flexible member 162 is damaged during the lid forming process.

Figure 10:
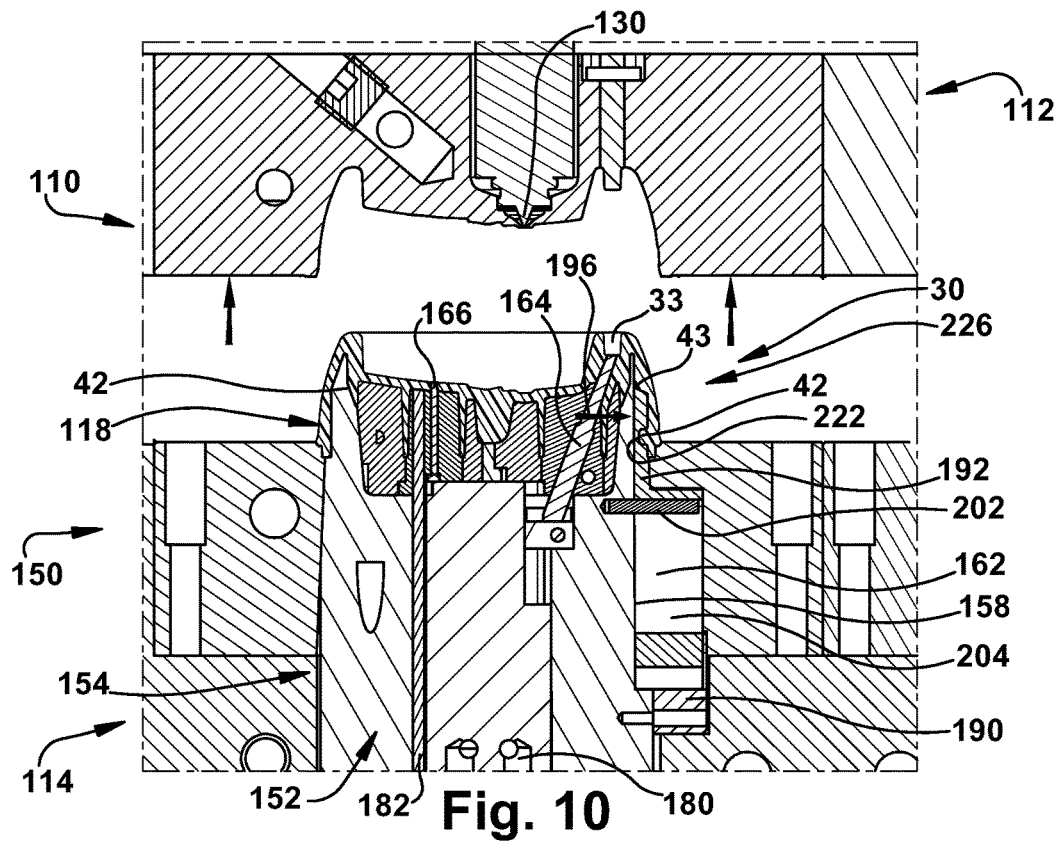
FIG. 10 is a cross-sectional view of the embodiment of FIG. 9 with the top form member raised.
Figure 11:
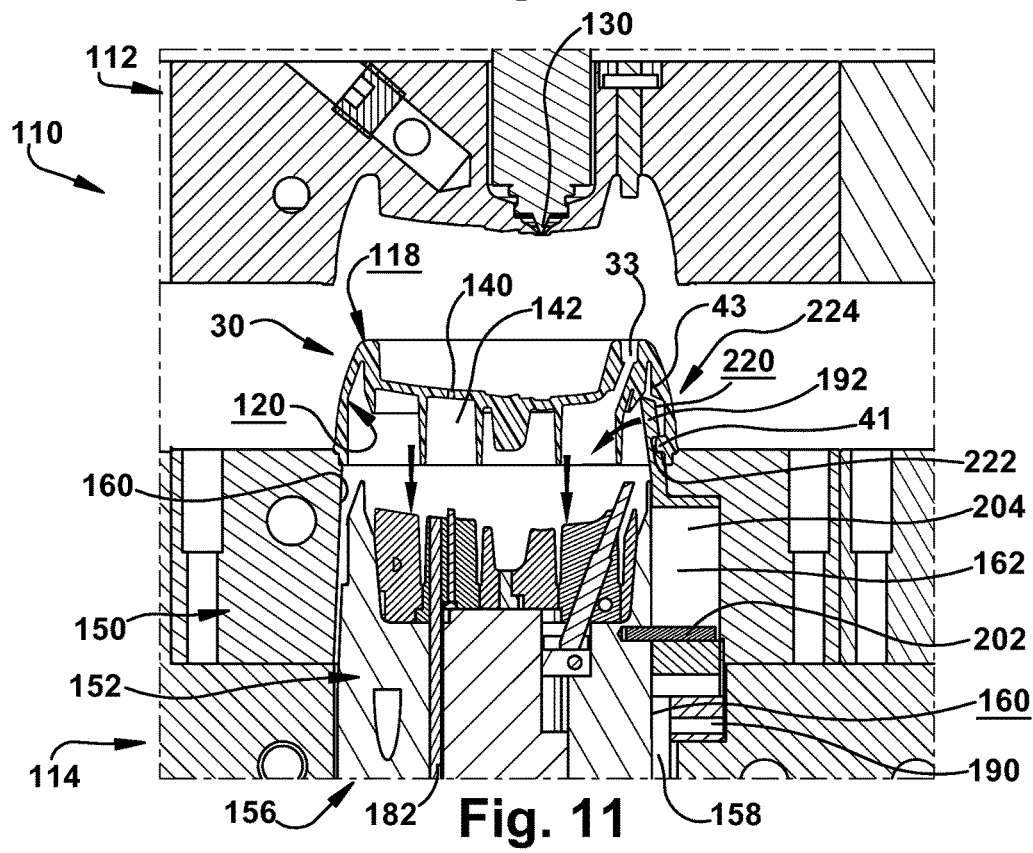
FIG. 11 is a cross-sectional view of the embodiment of FIG. 9 with the inner core form lowered.
Figure 12:
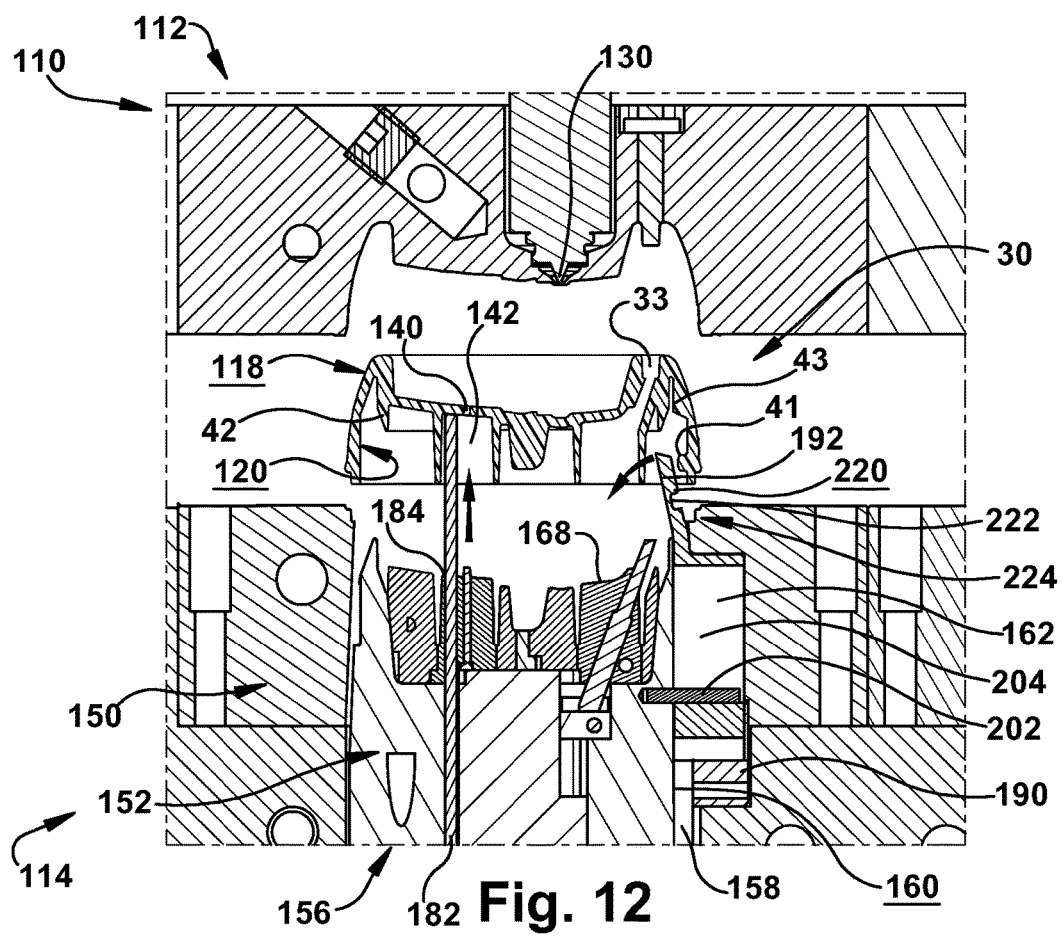
FIG. 12 is a cross-sectional view of the embodiment of FIG. 11 with the expulsion member raised and the lid removed from the flexible member.
Figure 13:
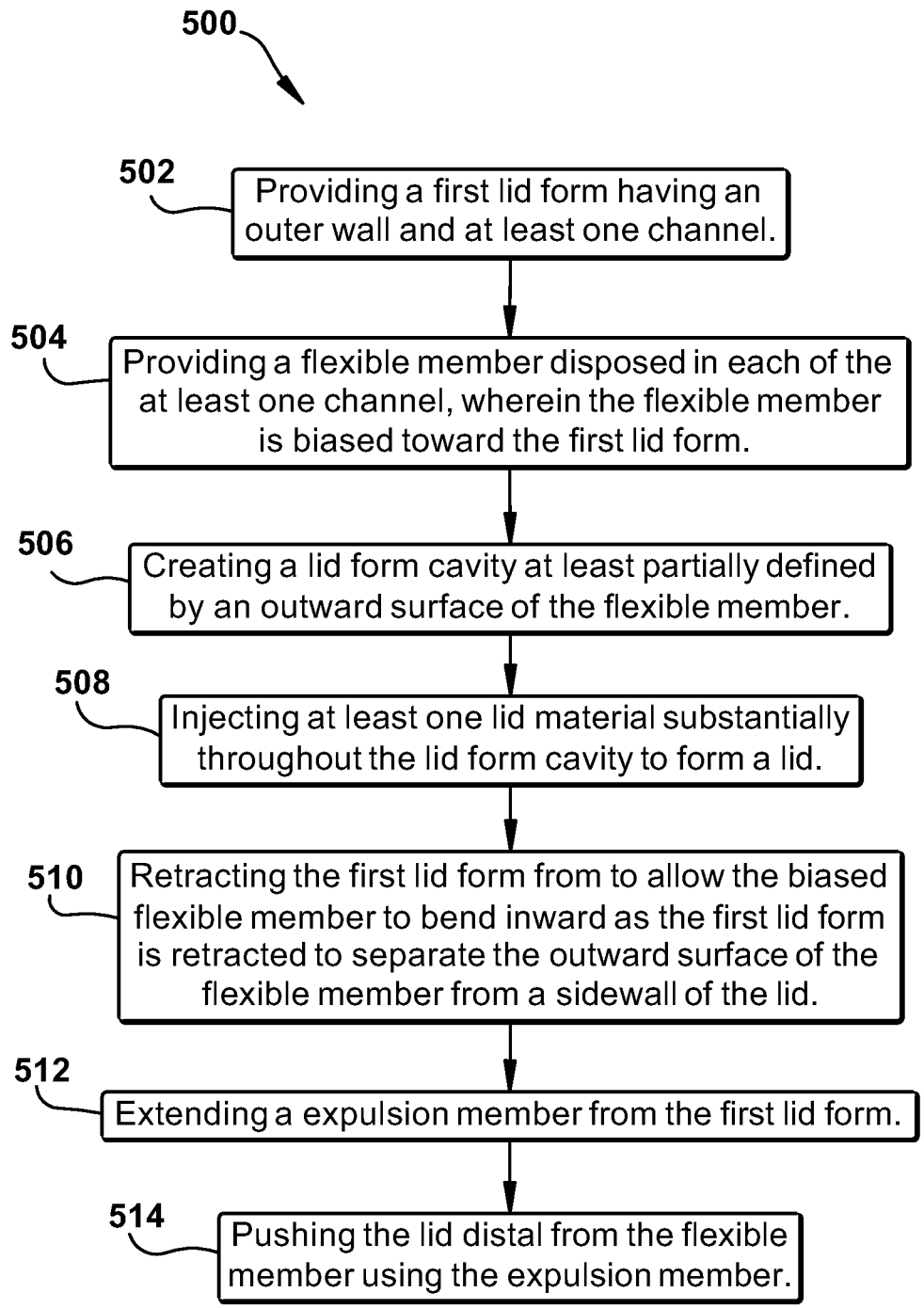
FIG. 13 is a schematic flow diagram illustrating one embodiment of a method for forming a container assembly.
Figure 14:
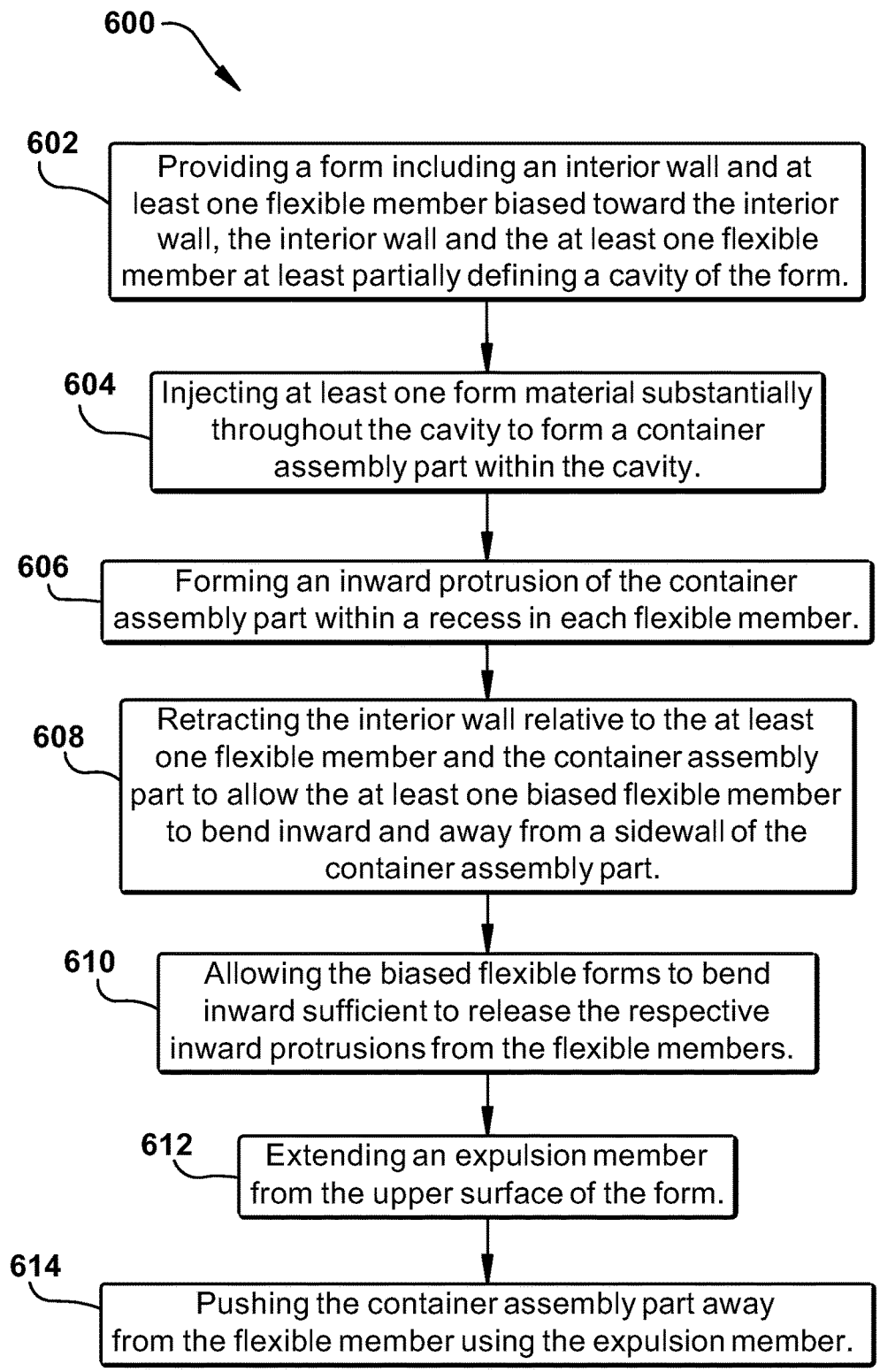
FIG. 14 is a schematic flow diagram of another embodiment of a method for forming a container assembly.
Figure 15:
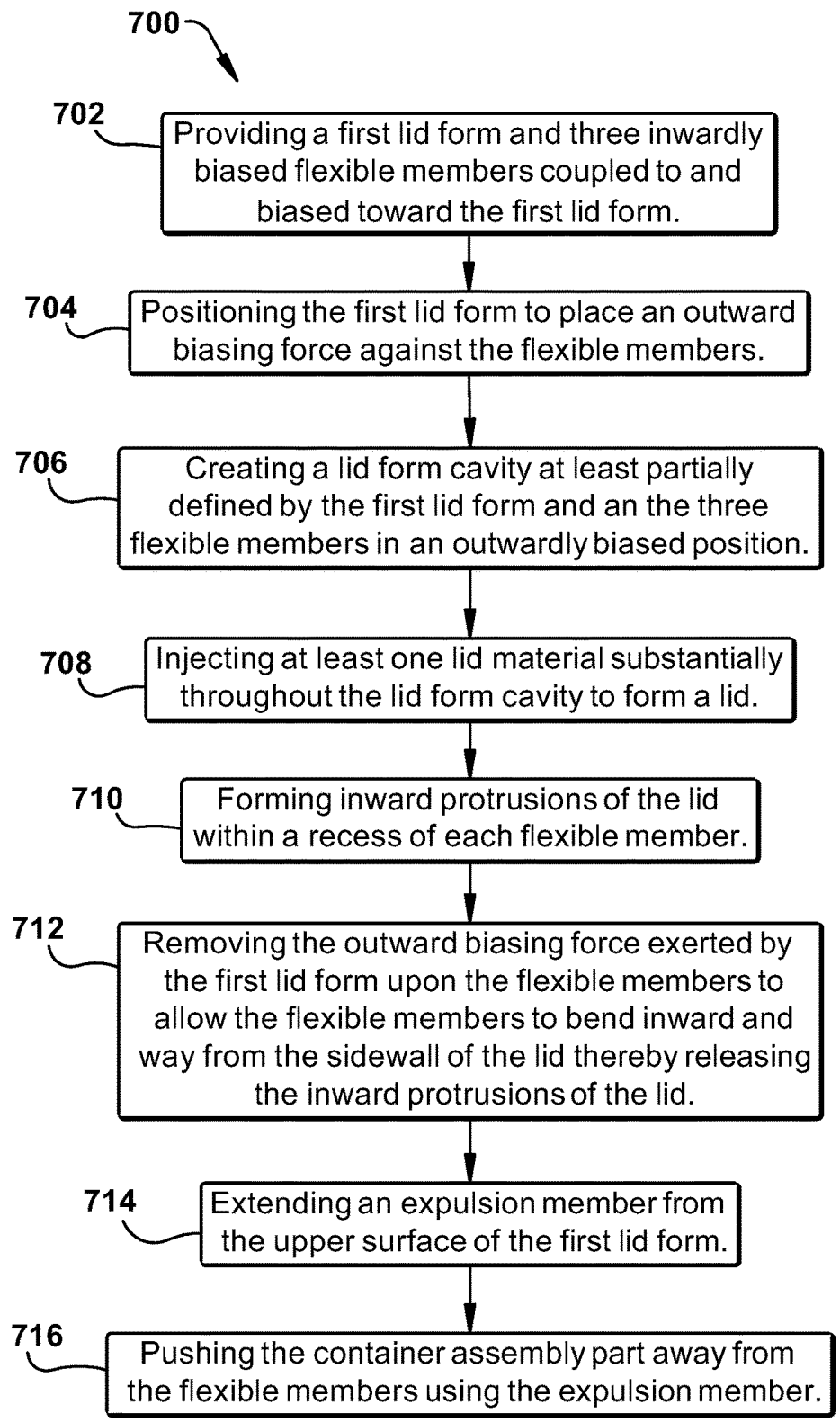
FIG. 15 is a schematic flow diagram for another alternate embodiment of the method for forming a container assembly.

Referring now to FIGS. 9-11, when the core form 152 is moved downward to the extraction position 156, the biased portion 192 of each of the flexible members 162 curves inward and away from the surface of the lower lid form 114. When the core form 152 is moved to the upward forming position 154, the core form 152 exerts an outward biasing force 196 against the biased portions 192 of each of the flexible members 162, such that the flexible members 162 are biased outward and placed in a generally vertical position within the corresponding form channels 158 of the core form 152.

As illustrated in FIGS. 7-11, the core form 152 includes a plurality of tabs 202 that extend outward from the outer surface 160 of the core form 152 and are received by a corresponding slot 204 defined within each flexible member 162. As the core form 152 is moved vertically between the forming position 154 and the extraction position 156, the tabs 202 of the core form 152 slide within the corresponding slot 204 of the flexible member 162 to maintain the alignment of the flexible members 162 and the core form 152. The slot 204 of the flexible member 162 is also configured to assist in limiting the vertical movement of the core form 152 within the lower cavity form 150. The form channel 158 of the core form 152 and the inner profile of each flexible member 162 are configured to have mating profiles such that when the core form 152 is disposed in the forming position 154, the profile of the lid form cavity 116 engages certain retention geometries 206 of the flexible member 162. By way of explanation, and not limitation, the biased portion 192 of each of the flexible members 162 includes a flared portion 208 such that the end of the flexible member 162 is wider than other portions of the flexible member 162. The form channel 158 includes a cooperating seat 210 that receives the flared portion 208 of the flexible member 162, thereby limiting the vertical movement of the core form 152 relative to the flexible members 162. Additional retention geometries 206 of the flexible member 162 can include various notches, protuberances, edges, and other features. Similarly, the form channel 158 of the core form 152 can include cooperating notches, edges, and other physical features that matingly cooperate with the retention features 194 of the flexible member 162 when the core form 152 is disposed in the forming position 154. Similar mating retention geometries 206 of the flexible member 162 and the form channel 158 can also be used to further define the extraction position 156 of the core form 152.

Referring again to FIGS. 7-12, an outward surface 220 of each flexible member 162 includes a recess 222 that defines a portion of the lid form cavity 116 within which the inward protrusion 41 of the lid 30 is formed when the forming material 132 is injected into the lid form cavity 116. When the core form 152 is disposed in the forming position 154, the flexible members 162 are substantially parallel with the core form 152, such that the inward protrusion 41 can be formed within each of the recesses 222. After the lid 30 is formed, the core form 152 is moved downward to the extraction position 156, thereby removing the outward biasing force 196 against the biased portions 192 of the flexible members 162. Accordingly, when the core form 152 is moved to the extraction position 156, the biased portions 192 of each flexible member 162 curve inward to the curved state 224. As the biased portions 192 of the flexible members 162 move inward to the curved state 224, the inward protrusion 41 of the lid 30 is substantially released from the recess 222, such that the lid 30 can be removed from each of the flexible members 162, without the flexible members 162 interfering with the inward protrusion 41 of the lid 30 as the lid 30 is removed from the injection molding assembly 110. The flexible members 162 can also be used to form other aspects of the lid 30 that include, but are not limited to, the inner flange 42, the flange biasing features 43, and the like.

With conventional injection forming methods, that use traditional two-directional lifters, these traditional lifters require that any surfaces that are formed by the lifter match the angle of motion of the lifter. This means that traditional forms are not configured to create horizontal surfaces that project outward from vertical surfaces when the traditional lifters move in a vertical path of travel. Attempting to make such horizontal projecting surfaces can result in damage to the formed material or to the form itself. These limitations are addressed through the use of the flexible members 162 as described above. The curved state 224 of the biased portion 192 of each of the flexible members 162 allows for a substantially passive horizontal movement of the form at the flexible members 162, in conjunction with the vertical movement of the core form 152 necessary to release the formed lid 30 from the injection molding assembly 110. According to this embodiment of the injection molding assembly 110, horizontal surfaces that project from vertical surfaces can be created while implementing a form assembly that is limited to mechanical movement in only a vertical direction. This injection molding assembly 110 removes the need for multi-part and multi-directional forms and helical forms that can be complex. Additionally, the above-described forms allow for relatively thin material thicknesses between the sidewall of the lid 30 and the flange. This distance can be between about 3 mm to about 4 mm. These substantially smaller distances also provides for thinner wall thicknesses T of the components of the container assembly 100 that are also more ergonomic and more aesthetically pleasing. The upper and lower walls 18, 18a of the container 10 and lid 30 can be formed to have a thickness from between about 1.5 mm to about 2.5 mm, according to one embodiment.

It is contemplated that the injection molding assembly 110 described above can be used to form horizontally projecting surfaces on other parts of the lid 30, the container 10, as well as other parts of the container assembly 100. Additionally, the use of the flexible forms can be used to create the various channels 17 of the closure mechanism 50 of the container assembly 100 as those features are described above.

Having generally described the injection molding assembly 110 for creating various aspects of the container assembly 100, a method 500 for forming a container assembly 100, as described above, is disclosed below. Referring to FIGS. 7-12, one embodiment of the method 500 includes step 502 of providing a first, or lower, lid form 114 having an outer wall and at least one form channel 158. The outer wall of the first lid form 114 can include the core form 152 as described above, wherein the outer surface 160 of the core form 152 includes the at least one form channel 158. Step 504 of the method 500 includes providing the flexible member 162 disposed in each form channel 158, wherein the flexible member 162 is biased toward the outer wall. As discussed above, the biased portions 192 of the flexible members 162 are biased toward the outer wall of the core form 152, wherein the outer wall of the core form 152, when disposed in the forming position 154, exerts an outward biasing force 196 against each flexible member 162 to dispose each flexible member 162 in a substantially parallel configuration relative to the core form 152. Each flexible member 162 in the forming position 154 is further disposed within the form channel 158 such that the engagement geometries of the flexible member 162 and the corresponding form channel 158 matingly engage with one another. The method 500 also includes step 506 which includes creating a lid form cavity 116 that is at least partially defined by an outward surface 220 of the flexible member 162. In various embodiments, the lid form cavity 116 can also be defined by the outer surface 160 of the core form 152, as well as lid forming portions of the upper lid form 112. Step 508 includes injecting at least one lid 30 material substantially throughout the lid form cavity 116 to form a lid 30. In various embodiments, the lid 30 material can include, but is not limited to, rubber, plastic, polymers, and other substantially formable materials. Part of this step 508 of injecting the lid 30 material includes forming the inward protrusion 41 within the recess 222 defined by the outward surface 220 of each flexible member 162. In this manner, the inward protrusion 41 is disposed on an inward-facing surface 120 of the side wall of the lid 30. As discussed above, it is contemplated that the flexible members 162 can be used to form external protrusions 34 on the outward-facing surface 118 of the lid 30, as well as various alternate horizontally protruding surfaces and geometries that extend outwardly or inwardly from the substantially vertical surfaces of the body 11 and the neck 12 of the container 10. Once the lid 30 is formed, step 510 of the method 500 includes retracting the lid form, such as the core form 152, from the forming position 154 relative to the flexible members 162 and the lid 30. In this manner, the core form 152 is moved to the extraction position 156, wherein the biased portion 192 of the flexible member 162 is biased inward toward the curved state 224 as the core form 152 is retracted. In this manner, the outward surface 220 of the flexible member 162, being disposed in the curved state 224, is substantially separated from the side wall of the lid 30. As the biased portion 192 moves inward, the inward protrusion 41 is released from the recess 222 to allow the lid 30 to be removed from the flexible member 162 without the flexible form interfering with the inward protrusion 41. Step 512 of the method 500 includes separating the lid 30 from the flexible member 162 by extending at least one expulsion member 182 from a corresponding expulsion aperture 184 defined within the top surface 168 of the core form 152. It is contemplated that the core form 152 can include more than one expulsion member 182, depending upon the configuration of the lid 30 being removed through the flexible members 162, as well as the configuration of the flexible members 162 used to form the various protrusions of the lid 30 or other part of the container assembly 100. Once the lid 30 has been removed from the flexible members 162, the core form 152 of the lower cavity form 150 is returned to the forming position 154. In this manner, the expulsion member 182 is retracted and the core form 152 is extended from the extraction position 156 to the forming position 154, such that the flexible member 162 is moved to the outwardly biased state 226 by the outward biasing force 196 exerted by the outer surface 160 of the core form 152. In this manner, the flexible member 162 is positioned within the corresponding form channel 158 of the core form 152 as the core form 152 is moved into the forming position 154.

In various embodiments, the lower cavity form 150 can include several flexible members 162 that correspond to the same number of cooperating form channels 158 of the core form 152. As shown, the core form 152 includes three form channels 158 that cooperate with three corresponding flexible members 162. The core form 152 can be made of various metallic materials that include, but are not limited to, stainless steel, tool grade steel, steel alloys, aluminum, aluminum alloys, as well as resins, and other form materials. By way of explanation, and not limitation, the core form 152 can be made of 5136 stainless steel having an HRC of between about 50 to about 52. Similarly, the various lifting and sliding portions of the injection molding assembly 110, including the flexible members 162, can be made of various metallic materials that include, but are not limited to, tool grade steel, stainless steel, other metals, metal alloys, combinations thereof, as well as resins, and other form materials. By way of explanation, and not limitation, the flexible members 162 can be made of 8407 hot work steel, such as an H13 steel having an HRC of between about 52 to about 54.

Referring now to FIGS. 9-12 and 14, an alternate embodiment of the method 600 for forming a component of the container assembly 100 includes step 602 of providing a form including an interior wall, such as the core form 152, and at least one flexible member 162 that is biased toward the interior wall, wherein the interior wall and the at least one flexible member 162 at least partially define a cavity 116 of the form. Step 604 of the method 600 includes injecting at least one forming material 132 substantially throughout the cavity 116 to form a part of the container assembly 100 within the cavity 116. It is contemplated that the container assembly 100 part can be a lid 30, a container 10, or other portion of the container assembly 100. Step 606 of the method 600 includes forming an inward protrusion 41 of the part of the container assembly 100 within a recess 222 defined within the flexible member 162. According to the method 600, step 608 includes retracting the interior wall (e.g., the core form 152), relative to the at least one flexible member 162 and the container assembly 100 part to allow a biased portion 192 of the flexible member 162 to bend inward and away from a side wall of the container assembly 100 part. In this manner, the flexible member 162 is rotated away from the side wall of the part of the container assembly 100 and the inward protrusion 41, such that the part of the container assembly 100 can be removed from the flexible member 162 without damaging the flexible member 162 or the inward protrusion 41, according to step 610 of the method 600. Step 612 of the method 600 includes separating the formed part of the container assembly 100 from the flexible member 162 by extending the expulsion member 182 from the expulsion aperture 184 in the top surface 168 of the core form 152. Step 614 includes pushing the formed part of the container assembly 100 away from the flexible member 162 using the expulsion member 182.

Referring now to FIGS. 9-12 and 15, yet another embodiment of the method 700 is described. This method 700 includes step 702 providing a lid form, such as the core form 152, and three inwardly biased flexible members 162 that are coupled to and biased toward the lid form. Step 704 includes positioning the lid form, or the core form 152, to exert an outward biasing force 196 against the flexible members 162. Once the core form 152 is positioned according to step 704, step 706 includes creating a lid form cavity 116 that is at least partially defined by the lid form and the three flexible members 162, the flexible members 162 being disposed in an outwardly biased position 226. The outwardly biased position 226, as described above, includes the flexible members 162 being disposed within the corresponding form channels 158 and the flexible members 162 matingly engaging the cooperative surfaces of each form channel 158. Step 708 of the method 700 includes injecting at least one forming material 132 substantially throughout the lid form cavity 116 to form the lid 30. As the lid 30 is being formed, step 710 includes forming inward protrusions 41 of the lid 30 within recesses 222 defined by each flexible member 162. Step 712 of the method 700 includes removing the outward biasing force 196 exerted by the first lid form 114 upon the flexible members 162 to allow the flexible members 162 to bend inward to the curved state 224. In this manner, the flexible members 162 are allowed to bend away from the inward-facing surface 120 of the side wall of the lid 30, thereby releasing the inward protrusion 41 of the lid 30. As discussed above, removing the outward biasing force 196 can be accomplished by moving the core form 152 from the forming position 154 to the extraction position 156. In various embodiments, the outward biasing force 196 can be removed by moving the flexible members 162 in the vertical direction, rather than the core form 152. In this manner, the core form 152 would remain substantially fixed relative to the lower cavity form 150, while the flexible members 162 would be moved upward to an extraction position 156 wherein the biasing portion of each flexible member 162 is moved away from the core form 152 such that the outward biasing force 196 is removed and the biased portions 192 of the flexible members 162 are allowed to curve inward to the curved state 224 and away from the side wall of the lid 30 and the inward protrusion 41. The flexible members 162 would then be lowered back into the forming position 154 wherein the outer surface 160 of the core form 152 would exert the outward biasing force 196 to position each flexible member 162 in a substantially parallel configuration to the core form 152 and within the corresponding form channel 158 in the outwardly biased state 226. According to step 714 of the method 700, an expulsion member 182 is extended from the top surface 168 of the core form 152 to remove the lid 30 from the flexible members 162. Step 716 includes pushing the formed part of the container assembly 100 away from the flexible members 162 using the expulsion member 182.

The present disclosure having been thus described with particular reference to the preferred forms thereof, it will be obvious that various changes and modifications may be made therein without departing from the spirit and scope of the present disclosure as defined in the disclosure and the claims.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A method for forming a container assembly having a lid, a container and a cooperative closure mechanism defined by the lid and the container, the method comprising:
providing a first lid form having an outer wall and at least one channel;
providing a flexible member having a flared end such that a width at the flared end is greater than the remainder of a biased portion of the flexible member, disposed in each of the at least one channel, wherein the flexible member is biased toward the outer wall;
creating a lid form cavity at least partially defined by an outward surface of the flexible member;
injecting at least one lid material substantially throughout the lid form cavity to form a lid;
retracting the first lid form from a forming position relative to the flexible member and the lid to an extraction position, wherein the flexible member is biased inward as the first lid form is retracted to separate the outward surface of the flexible member from a side wall of the lid; and
separating the lid from the flexible member.

2. The method of claim 1, wherein the step of injecting the at least one lid material includes forming an inward protrusion within a recess defined by the outward surface of each flexible member, wherein the inward protrusion is disposed on an inward surface of the side wall of the lid.

3. The method of claim 2, wherein the first lid form includes a plurality of channels, wherein each of the plurality of channels is configured to receive a corresponding flexible member.

4. The method of claim 3, wherein the first lid form includes three channels.

5. The method of claim 1, wherein the flexible member is made of a tool grade steel.

6. The method of claim 1, wherein the lid form cavity is defined by the first lid form, each flexible member and a second lid form.

7. The method of claim 1, wherein the step of separating the lid from the flexible member includes:
extending at least one expulsion member from an expulsion aperture defined within an upper surface of the first lid form; and
pushing the lid distal from the flexible member using the at least one expulsion member.

8. The method of claim 7, further comprising the steps of retracting the expulsion member, and
extending the first lid form from the extraction position to the forming position, wherein the flexible member is biased outward by and positioned within the corresponding at least one channel of the first lid form as the first lid form is moved into the forming position.

9. A method for forming a container assembly having a lid, a container and a cooperative closure mechanism defined by the lid and the container, the method comprising:
providing a form including an interior wall and at least one flexible member having a flared end such that a width at the flared end is greater than the remainder of a biased portion of the flexible member, biased toward the interior wall, the interior wall and the at least one flexible member at least partially defining a cavity of the form;
injecting at least one form material substantially throughout the cavity to form a container assembly part within the cavity; and
longitudinally retracting the interior wall relative to the at least one flexible member and the container assembly part from a forming position to an extraction position, wherein each of the at least one flexible member is biased inward toward the interior wall of the form and away from a side wall of the container assembly part; and
separating the container assembly part from the flexible member.

10. The method of claim 9, wherein a recess is defined within each at least one flexible member, each recess further defining the cavity, and wherein the step of injecting the at least one form material includes forming an inward protrusion of the container assembly part within each recess, and wherein when the form is longitudinally retracted and the at least one flexible member is biased inward, the inward protrusion of the container assembly part is disengaged from the corresponding recess of each of the at least one flexible member.

11. The method of claim 10, wherein the form includes a plurality of flexible members.

12. The method of claim 11, wherein the form includes three flexible members.

13. The method of claim 9, wherein the at least one flexible member is made of a tool grade steel having an HRC of between about 52 to about 54.

14. The method of claim 9, wherein the cavity is defined by the interior wall, the at least one flexible member and an outer wall.

15. The method of claim 9, wherein the step of separating the container assembly part from the at least one flexible member includes:
extending at least one expulsion member from an expulsion aperture defined within an upper surface of the form; and
pushing the container assembly part distal from the flexible member using the at least one expulsion member.

16. The method of claim 15, further comprising the steps of:
retracting the expulsion member; and
extending the interior wall from the extraction position to the forming position, wherein the at least one flexible member is biased outward by the interior wall as the interior wall is moved into the forming position.

17. A method of forming a container assembly having a lid, a container and a cooperative closure mechanism defined by the lid and the container, the method comprising:

providing a first lid form and three flexible members each having a flared end such that a width at the flared end is greater than the remainder of a biased portion of each of the three flexible members, coupled to and biased toward the first lid form, wherein the first lid form and the three flexible members are operable between a forming position defined by the first form member exerting a biasing force against the three flexible members, and an extraction position defined by the biasing force of the first form member being substantially removed from the three flexible members;

creating a lid form cavity at least partially defined by the first lid form and the three flexible members disposed in the forming position;

injecting at least one lid material substantially throughout the lid form cavity to form a lid;

disposing the first lid form and the three flexible members in the extraction position, wherein the first lid form is moved distal from the lid and the three flexible members are biased away from a side wall of the lid; and separating the lid from the three flexible members.

18. The method of claim 17, wherein each of the three flexible members includes a corresponding recess, and wherein the step of injecting at least one lid material includes forming an inward protrusion within each recess.

19. The method of claim 17, wherein the three flexible members are made of tool grade steel having an HRC of between about 52 to about 54.

20. The method of claim 17, wherein the step of separating the lid from the three flexible members includes:

extending at least one expulsion member from an expulsion aperture defined within an upper surface of the first lid form;

pushing the lid distal from the three flexible members using the at least one expulsion member;

capturing the lid distal from the three flexible members and the first lid form retracting the at least one expulsion member; and positioning the first lid form and the three flexible members in the forming position.

\* \* \* \* \*